(12) United States Patent
U

(10) Patent No.: US 9,858,219 B2
(45) Date of Patent: Jan. 2, 2018

(54) HARDWARE TIMER BASED MECHANISM TO CHECK INTERRUPT DISABLED DURATION

(71) Applicant: Intel Corporation, Santa Clara, CA (US)

(72) Inventor: Satish G. U, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 313 days.

(21) Appl. No.: 14/495,826

(22) Filed: Sep. 24, 2014

(65) Prior Publication Data
US 2016/0085700 A1    Mar. 24, 2016

(51) Int. Cl.
*G06F 13/00* (2006.01)
*G06F 13/26* (2006.01)

(52) U.S. Cl.
CPC .................................. *G06F 13/26* (2013.01)

(58) Field of Classification Search
CPC ...................................................... G06F 13/26
See application file for complete search history.

(56) References Cited

U.S. PATENT DOCUMENTS

| 5,276,888 A | 1/1994 | Kardach et al. |
| 5,937,199 A * | 8/1999 | Temple ................... G06F 13/24 710/262 |
| 2012/0210104 A1* | 8/2012 | Danko ................ G06F 9/30076 712/229 |
| 2013/0067133 A1 | 3/2013 | Mansell et al. |

* cited by examiner

*Primary Examiner* — Zachary K Huson
(74) *Attorney, Agent, or Firm* — Nicholson De Vos Webster & Elliott, LLP

(57) ABSTRACT

In one embodiment, a timer apparatus is configured to time a duration in which interrupts are disabled on a processor. The apparatus includes an input to receive a start signal indicating that an interrupt on a processor is disabled, a counter to determine the duration in which interrupts are disabled, and an output to signal a timer event based on the counter. The processor may be configured to trigger a hardware exception in response to the timer event signal. When the interrupts are re-enabled on the processor, the counter of the apparatus may be disabled.

20 Claims, 11 Drawing Sheets

HARDWARE TIMER BASED MECHANISM TO CHECK INTERRUPT DISABLED DURATION

FIELD

Embodiments relate generally to computer processor micro architecture and more specifically to checking or tracking the duration in which an interrupt is disabled on a processor.

BACKGROUND

An interrupt is the automatic transfer of software execution in response to a hardware event that is asynchronous with the current software execution. Hardware devices can use interrupts to signal to a processor that the hardware device requires service. Although hardware components may rely on interrupts to communicate with a processor, the processor experiences regular periods of time in which external interrupts are disabled.

For example, when the processor enters an interrupt service routine (ISR) to handle an interrupt, the processor may automatically disable the servicing of other interrupts. The processor may also disable the servicing of interrupts while performing atomic operations that cannot be interrupted. Additionally, software executing on the processor can disable interrupts by writing to a software register.

It is difficult to place a check on the duration in which interrupts are disabled, particularly on an embedded system. If interrupts are disabled for an extended period the processor may miss time critical interrupts that occur during this period. Missing time critical interrupts may lead to system instability, or other undesired effects.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

In spite of the undesired effects of unchecked periods in which interrupts are disabled, there are no complete and efficient solutions available in the art to check and manage the duration in which interrupts are disabled on a processor (e.g., the interrupt disabled duration). Each known solution includes several inherent limitations. For example, static analysis of software cannot fully predict the run-time behavior of a system due to various reasons such as cache operation time and clock scaling. Run-time software solutions that rely on system timers, such as watchdog timers or event timers are ineffective when interrupts are disabled. Additionally, system timers may lack the resolution required to monitor processor operations. While interrupt disabled duration may be checked by certain debug and trace utilities, debugging capacity is generally disabled in production systems.

In various embodiments, a dedicated timer is used to measure the Interrupt disable duration and trigger a hardware exception when an interrupt is disabled for more than a threshold. The timer can be implemented in a manner that is independent of instruction set architecture (ISA) and microarchitecture and may be used with any processor design, and may be external to or integrated into the design of a processor. The timer may be used to trigger an existing exception supported by the processor or the processor may provide support for new traps or exceptions to handle the timer exception. The processor may access timer registers on the timer to determine the interrupt disabled duration or may provide new instructions to allow software to access the timer registers.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that one skilled in the art would have the knowledge to affect such feature, structure, or characteristic in connection with other embodiments whether or not explicitly described.

In the following description and figures, numerous specific details are set forth to provide a through understanding of the embodiments. However, it is understood that embodiments may be practiced without these specific details. In other instances, well-known circuits, structures, and techniques have not been shown in detail in order not to obscure the understanding of this description.

Figure 1:
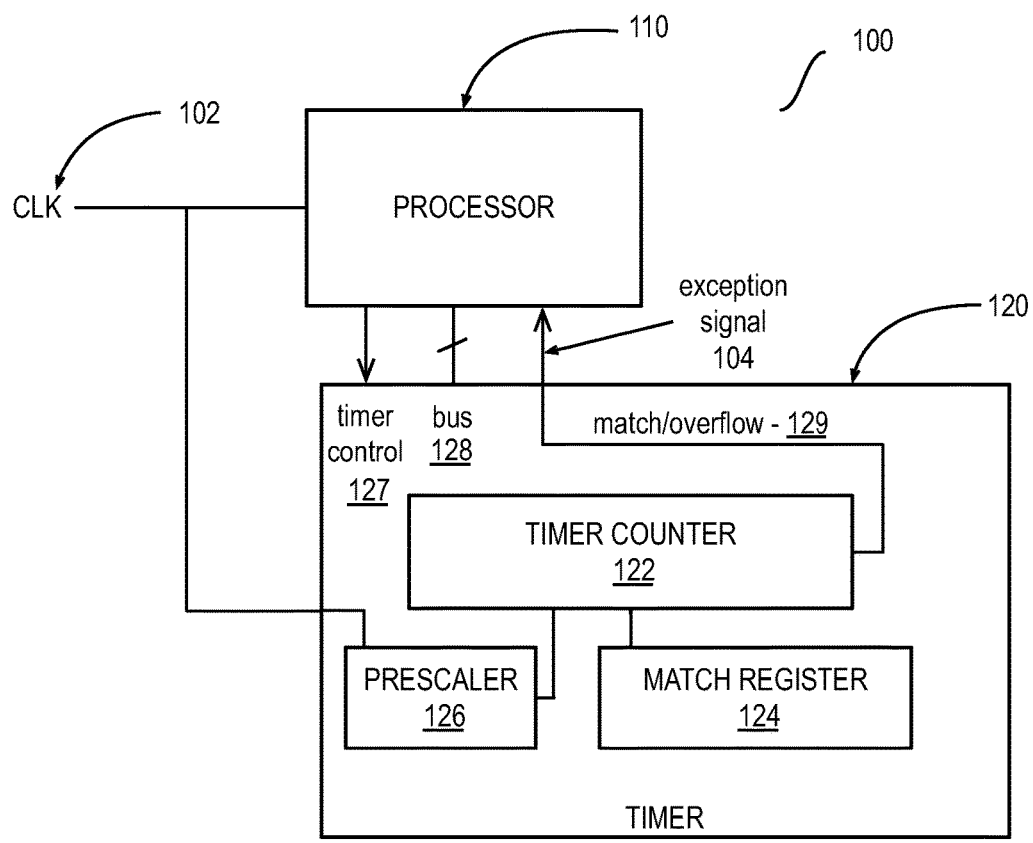
FIG. 1 is a block diagram of an exemplary embodiment of a processing system including a dedicated interrupt duration timer.

FIG. 1 is a block diagram of an exemplary processing system including a dedicated interrupt duration timer. In one embodiment, the system 100 includes a timer 120 coupled to a processor 110. The timer clock is coupled to or derived from the clock (e.g., CLK) signal 102 for the processor 110. The timer 120 includes a timer control 127, a dedicated input/output (I/O) bus 128, and an exception signal triggered by a match/overflow signal 129 from the timer counter 122. The match/overflow 129 signal may also assert on a timer overflow. The match/overflow signal 129 is coupled to an exception signal 104 output from the timer 120. The exception signal 104 is coupled to the processor 110 to trigger a hardware exception, which causes the processor to jump to an exception handler to respond to the exception caused by the timer 120. The exception handler may be a new exception handler or a modified version of an existing exception handler.

In one embodiment, the timer 120 is configured with a separate timer counter 122 for each interrupt line on the processor 110. In one embodiment, a separate timer 120 for each interrupt line is used. Each timer counter 122 may include one or more 32/64-bit timers configurable as multiple 32-bit timers or a single 64-bit timer. The timer counter 122 couples to a match register 124. The match register 124 can be configured to store a timeout value used to trigger the match/overflow 129 signal. In one embodiment the timer counter is a count up timer which triggers the match/overflow signal 129 when the value of the timer counter 122 is equal to the value in the match register 124. In one embodiment, the timer counter 122 is a countdown timer configured to count down from the timeout value. The timer counter 122 may be initialized to the default value or the counter may auto-initialize on startup from a value loaded in the match register 124.

The precise coupling may vary between processor architectures. In one embodiment, the exception signal 104 couples to a separate, dedicated input line to the processor to cause a dedicated exception. However, the exception signal 104 may also couple to a shared input line on the processor to cause a dedicated exception, or may couple to an existing input line on the processor to cause an existing exception. In one embodiment, the exception signal 104 can coupled to a non-maskable interrupt line of the processor 110, or a dedicated high priority interrupt line which cannot be disabled. In processor designs known in the art, at least one external interrupt line generally remains available (e.g., unmasked) for high priority interrupts even when one or more other interrupt lines are disabled or ignored (e.g., masked). In one embodiment, the timer is internal to the processor and causes an internal hardware interrupt.

When the exception signal 104 is triggered, the timer 120 may provide a vector over the data bus 128 to reference an exception handler that is configured to handle exceptions from the timer 120. Alternatively, the high priority interrupt handler may be unvectored and will automatically retrieve a set of data from one or more status registers to determine the cause of the interrupt. In handling the exception, the processor 110 may access internal timer status flags via the bus 128 to indicate that a timer match or timer overflow has occurred. The processor 110 may additionally include instructions to allow software to access the match register 124 via the bus 128, to enable software to register trap handlers that make use of the timer 120. In one embodiment, the timer 120 causes the processor to enter system management mode (SMM) via a system management interrupt (SMI). An SMM handler in system firmware may then handle the interrupt disabled timeout.

The timer counter 122 is coupled with the clock signal 102 for the processor 110 and can be configured to operate at the frequency of the processor 110. Operating at the processor clock frequency allows the timer to maintain a high timer resolution relative to the processor. For example, the timer counter 122 for a processor operating at 1 Gigahertz can have up resolution of one nanosecond without additional clock multiplication. In one embodiment the timer includes a prescaler 126 to downscale the clock signal 102, allowing a variable timer resolution.

In one embodiment, the match register 124 is programmed during system initialization with a default timeout value that is based a number of clock cycles. The number of clock cycles may be pre-determined at system initialization or externally programmable. In one embodiment, the match register 124 or prescaler 126 may be adjusted to compensate for clock speed scaling on processors having variable speed clocks. In one embodiment, the adjustment is performed automatically during processor frequency scaling. In such embodiment the timer 100 includes logic to automatically shift or adjust a value in the match register 124 or prescaler 126 based on the updated processor frequency.

In one embodiment, the processor 110 (e.g., via microcode) automatically enables the timer 120 via the timer control 127 input whenever interrupts are disabled (e.g., when the interrupt flag is cleared). The processor then automatically disables the timer 120 and resets the timer counter 122 when interrupts are re-enabled. In one embodiment, the timer control 127 is tied to the interrupt or interrupt acknowledge line on the processor and automatically begins counting when the processor receives or acknowledges an interrupt signal.

The timer system 100 of FIG. 1 is exemplary and one having ordinary skill in the art will be able to apply the referenced concepts to an interrupt driven processor design of various microarchitectures and instruction set architectures. For example, the referenced concepts may be implemented in processors using microarchitecture from Intel Corporation of Santa Clara Calif. or Advanced Micro Devices Inc. of Sunnyvale Calif., which each implement versions of the x86 instruction set. The concepts are also applicable to processors based on the MIPS instruction set of MIPS Technologies of Sunnyvale, Calif. or the ARM instruction set of ARM Holdings of San Jose Calif.

Figure 2:
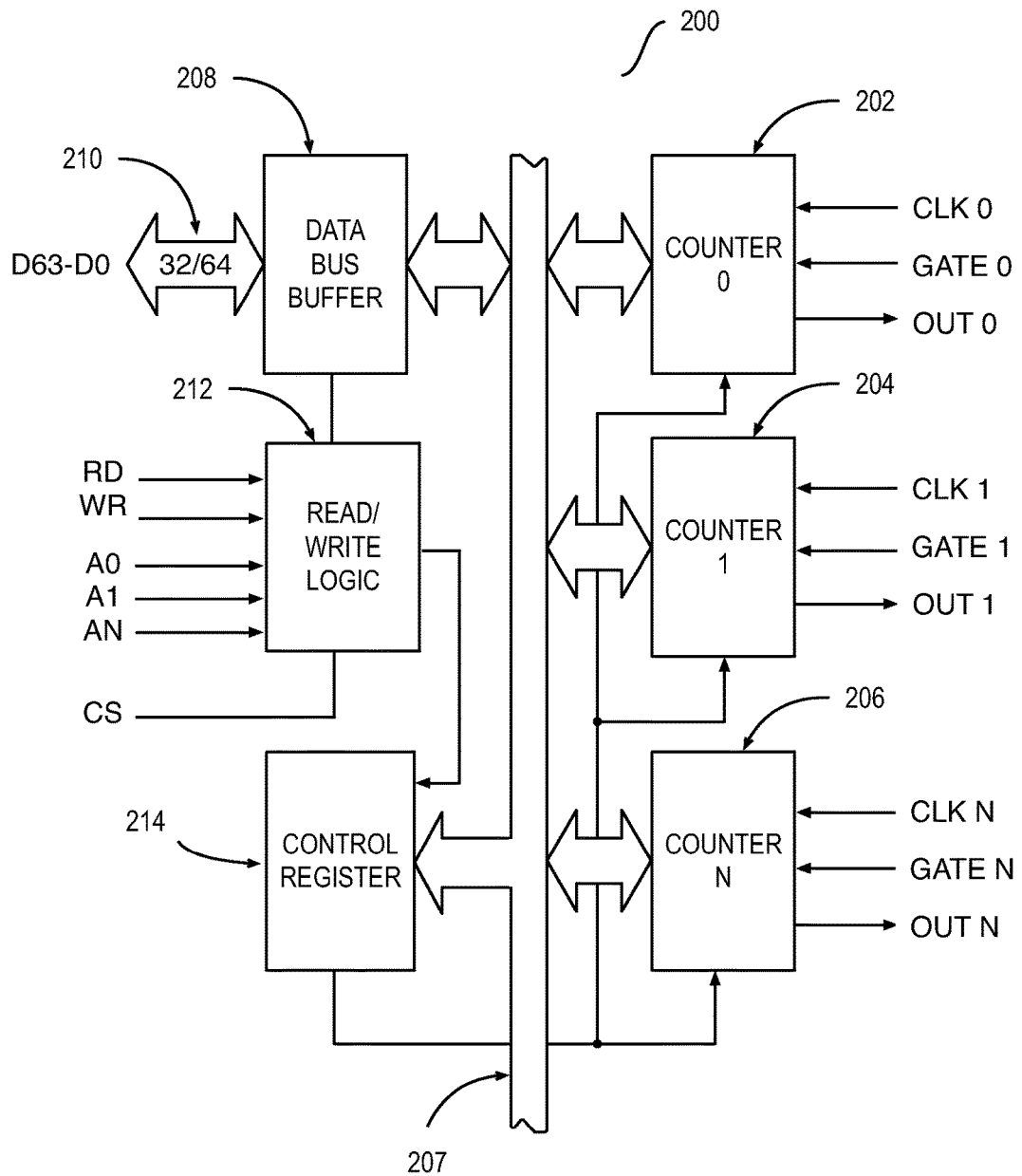
FIG. 2 is a block diagram of an exemplary timer circuit to time an interrupt-disabled period.

FIG. 2 is a block diagram of an exemplary timer circuit 200 to time an interrupt-disabled period, according to an embodiment. The timer circuit 200 may be used to implement a version of the timer 120 of FIG. 1. In one embodiment, the timer circuit 200 is a programmable timer including multiple counters (e.g., counter-0 202, counter-1 204, counter-N 206). Each of the counters includes a clock (e.g., CLK), gate, and output, where the clock for each counter is within the clock domain of the assigned processor, the output for each counter activates on counter expiration, and the gate enables or disables the counter. Each of the counters may be assigned to an interrupt request line for each processor or processor core within a system. The number of counters assigned to each processor corresponds with the number if interrupt inputs to check. Accordingly, the timer circuit 200 is configurable to include at least 'N' number of counters corresponding to the number of processors multiplied times the number of interrupt inputs for each processor. For some processors this may include a single interrupt line per processor, while other processors may include multiple interrupt lines per processor.

The counters couple with an internal bus 207, which may be a 32-bit or 64-bit data bus. A control register 214 and a data bus buffer 208 may also couple to the internal bus. In one embodiment, the data bus buffer 208 is a tri-state, bi-directional 64-bit buffer. The data bus buffer 208 provides access to or from an external data bus 210, which can be a 64-bit or 32-bit data bus. In one embodiment, the control register 214 includes one or more 64-bit registers to store control data for the timer circuit 200. The control data can include an operational mode or a default timeout for the counters. The control register 214 can also couple with each of the counters independently of the internal bus 207 to allow the counters to access timer configuration data.

The timer circuit 200 also includes read/write logic 212 with read (RD) and write (WR) pins, a chip select (CS), and sufficient address lines (e.g., A0-AN) to address each of counter-0 202, counter-1 204, through to counter-n 206, as well as the control register 214. The read/write logic 212 can couple with the data bus buffer 208 to configure the direction of the data flow based on the read and write pins, and to configure the control register to accept control data from the external bus 210, which, in one embodiment, is a dedicated bus to couple the timer 200 to a processor or processor core.

Figure 3:
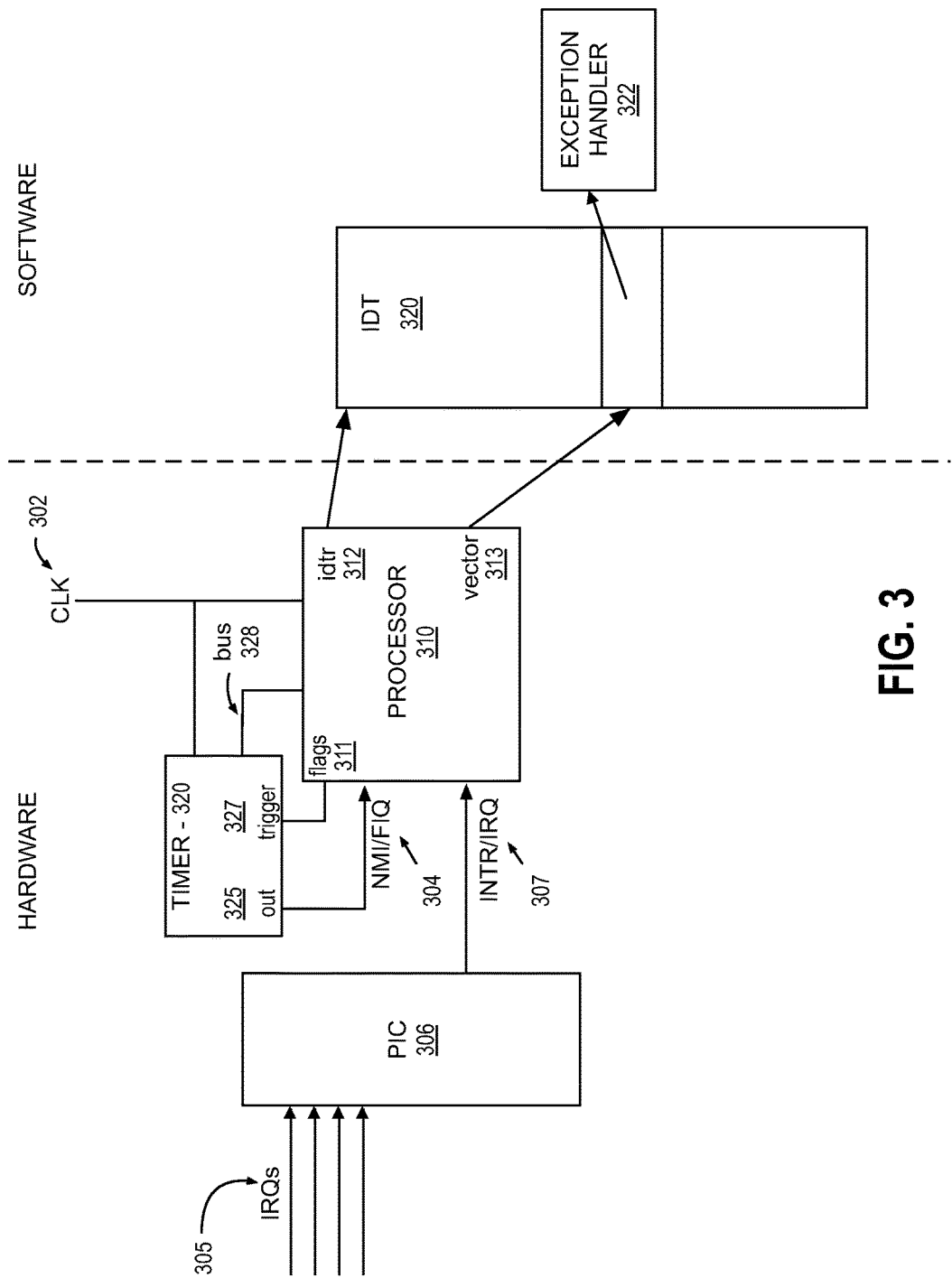
FIG. 3 is a block diagram of an additional data processing system, according to an embodiment.

FIG. 3 is a block diagram of an additional data processing system including a processor 310, an interrupt disabled timer 320, and a programmable interrupt controller 306, according to an embodiment. The timer 320 couples with the processor CLK signal 302, or is otherwise synchronous with the processor clock. For example, one or more phase locked loop circuits (PLLs) may be used to multiply a common external clock signal using the same clock multipliers as the processor.

The interrupt disabled timer 320 can include a timer trigger 327 to start the timer and an output 325 to indicate a timer event. In one embodiment the output 325 couples to an unmasked or non-maskable high priority interrupt line 304 of the processor, such as an unmasked fast interrupt request (FIQ) line on an ARM processor or a non-maskable interrupt (NMI) on x86 or MIPS processor. The interrupt line 304 can also be a high-priority interrupt line that is configured to be non-maskable, such that the interrupt line 304 remains active when all other external hardware interrupts are disabled. A dedicated exception input line to the processor may also be used to trigger timer exceptions.

The timer 320 can be used in a system that includes a programmable interrupt controller (PIC) 306. In one embodiment, one or more interrupt request (IRQ) inputs 305 couple with the programmable interrupt controller (PIC) 306, which arbitrates the interrupt requests by priority and can be configured to mask interrupts by priority level. The PIC 306 couples with the processor 310 via one or more interrupt lines (e.g., INTR/IRQ 307). In one embodiment, the timer 320 resets to an initial value on power up. In one embodiment, the timer resets to the initial value each time the timer is triggered. The timer circuit may be a count up timer including a counter, a match register and an arithmetic logic unit (ALU) to compare the counter against the match register at each clock cycle. When the processor 310 indicates that an interrupt line 307 has been disabled (e.g., via a flags register 311), the processor can signal the trigger 327 to start the timer. When the interrupt line 307 is re-enabled, the timer 320 is disabled. The timer may also be a countdown timer that decrements from an initial value and asserts the outputs 325 at zero.

When the interrupt line 304 is triggered by the output 325 the processor references an idtr pointer 312 to an interrupt descriptor table (IDT) in memory and computes a pointer or offset vector 313 to access an interrupt/exception handler 322 in IDT 320. In one embodiment, the exception handler 322 is a standard NMI or FIQ interrupt handler that reads registers on the timer 320 to determine the cause of the NMI or FIQ interrupt. In one embodiment, the vector 313 is computed based on data (e.g., an interrupt ID) placed on the bus 328 by the timer after triggering the high priority exception 304 and the exception handler 322 is a specialized handler for interrupt disabled timeout exceptions. In one embodiment, the exception handler 322 is a trap handler installed by software (e.g., a kernel or a kernel module) to provide software support for the timer 320. The exception handler may include logic to diagnose the exception caused by the timer or to responds to the exception.

Figure 4:
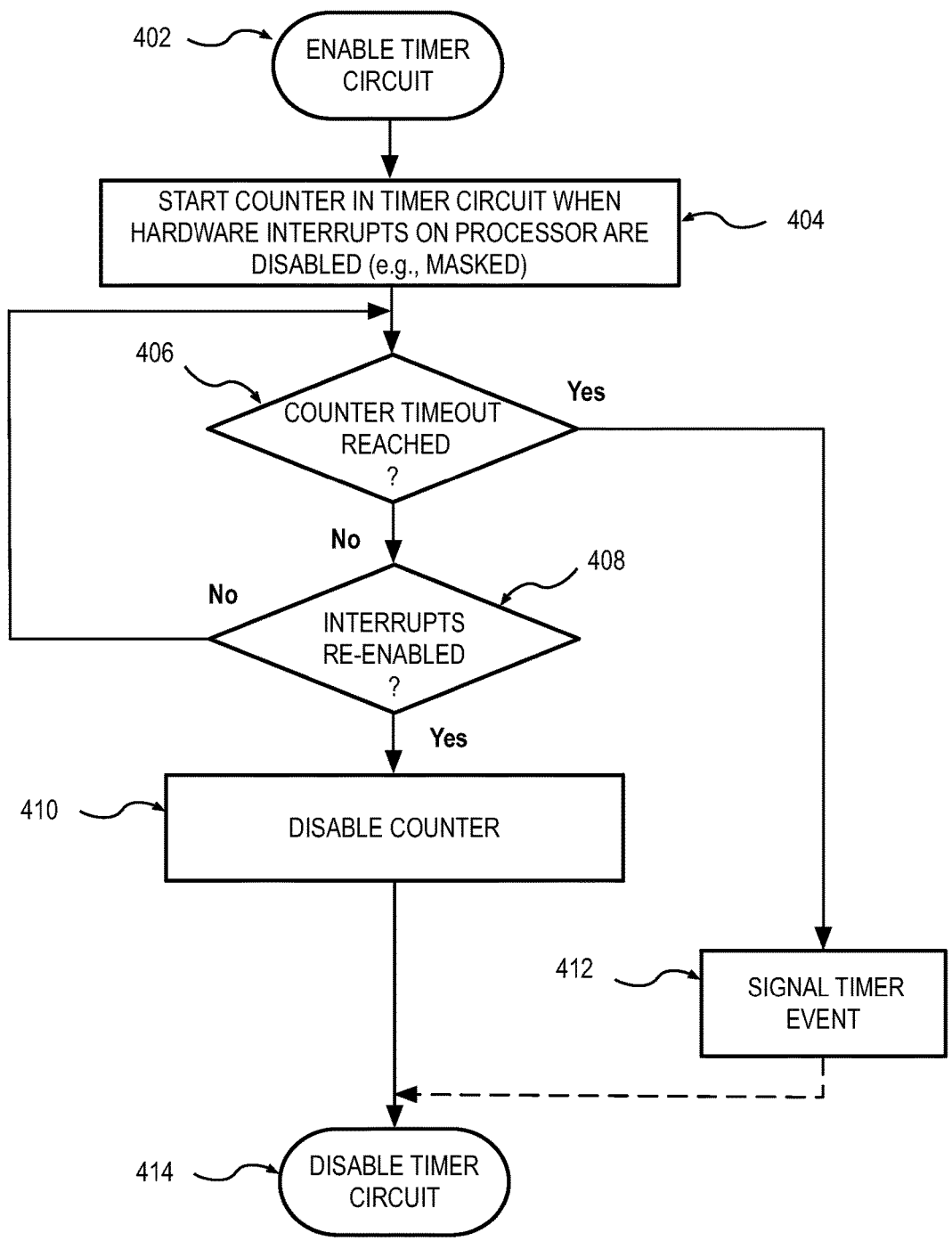
FIG. 4 is a flow diagram of logic to control an interrupt disabled timer, according to an embodiment.

FIG. 4 is a flow diagram of logic to control an interrupt disabled timer, according to an embodiment. The interrupt disabled timer can include independent logic to manage operations, can be managed by a processor or processor core to which the timer is coupled, or can be managed by other logic within the processor. In one embodiment, the management enables the timer circuit prior to starting the timer, as shown at block 402. However, at least a portion of the timer circuit may remain enabled while the processor is in an active power state. For example, if the timer circuit is a single integrated circuit including multiple counters dedicated separate processors or processor cores, the timer control circuitry may remain active while the individual counters are disabled when not in use.

As shown at block 404, a counter in the timer circuit is enabled when hardware interrupts on a processor are disabled. The counter can be started via mask indication caused by a timer control event from the processor or from control logic external to the processor. In one embodiment the counter is started automatically by the timer circuit in response to an activation of an interrupt line on the processor. In one embodiment the counter is started after, in conjunction with, or as a result of performing an instruction to disable hardware interrupts on a processor. In one embodiment, the counter is started as a result of a change in processor status flags that result in the disabling of hardware interrupts over one or more interrupt lines coupled to the processor.

The counter within the timer can count up to a counter timeout or count down from the counter timeout to zero. An ALU in the timer circuit can cause a timer event when the counter timeout value (e.g., timeout or zero) is reached, as shown at block 406. The timer event causes the timer circuit to send a timer event signal, as shown at block 412. In one embodiment, the timer is external to the processor and signals the processor via a high priority interrupt line (e.g., NMI, FIQ). In one embodiment, the timer is in communication with system firmware and may signal control logic in firmware to cause a system management interrupt (e.g., SMI). In one embodiment, the timer is included within the processor and uses internal processor logic to cause a hardware exception on the processor or a processor core.

In one embodiment the timer circuit alternates between determining if interrupts for the processor are re-enabled, at block 408, and determining if the counter timeout is reached, at block 406. If the timer circuit receives an unmask indication to signal that processor interrupts have been re-enabled, the timer circuit may disable the counter, as shown at block 410. As shown at block 414, the timer circuit may be disabled after the counter is disabled at block 410. Additionally, the time circuit may be at least partially disabled after a period of time when the timer event is signaled at block 412.

Timer Integration within Exemplary Processors

Figure 5:
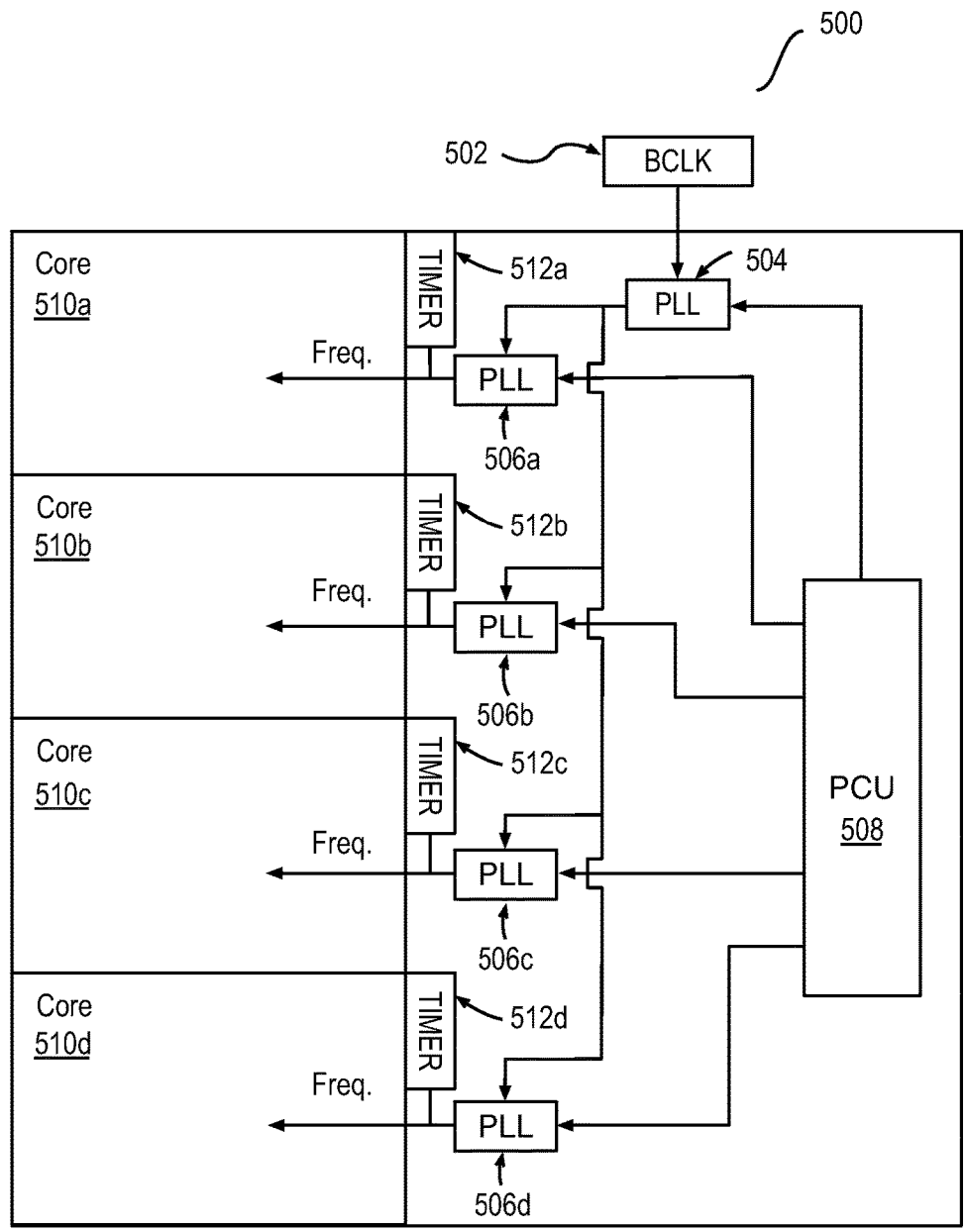
FIG. 5 is block diagram of a processor including a dedicated interrupt disabled timer per processor core, according to an embodiment.

FIG. 5 is block diagram of a processor 500 including a dedicated interrupt disabled timer 512 per processor core 510, according to an embodiment. In one embodiment, the processor 500 includes multiple processor cores 510 (e.g., 510*a*, 510*b*, 510*c*, 510*d*). Each of the cores 510 couples to a dedicated timer 512 (e.g., 512*a*, 512*b*, 512*c*, 512*d*) that is configured to time the duration for which one or more hardware interrupts are disabled for each core 510. Each timer 512 is clocked at the same frequency as the associated core 510. In one embodiment the clock frequency for the processor is controlled by a power control unit (PCU) 508 via a PLL 504 coupled to a base processor clock input. In one embodiment, the clock frequency of each core 510 and timer 512 is independently configurable by the PCU 508 via a PLL 506 (e.g., 506*a*, 506*b*, 506*c*, 506*d*). For variable frequency processors, each core 510 includes logic to avoid deadlocks in the event a timer event occurs during a processor frequency change.

Figure 6:
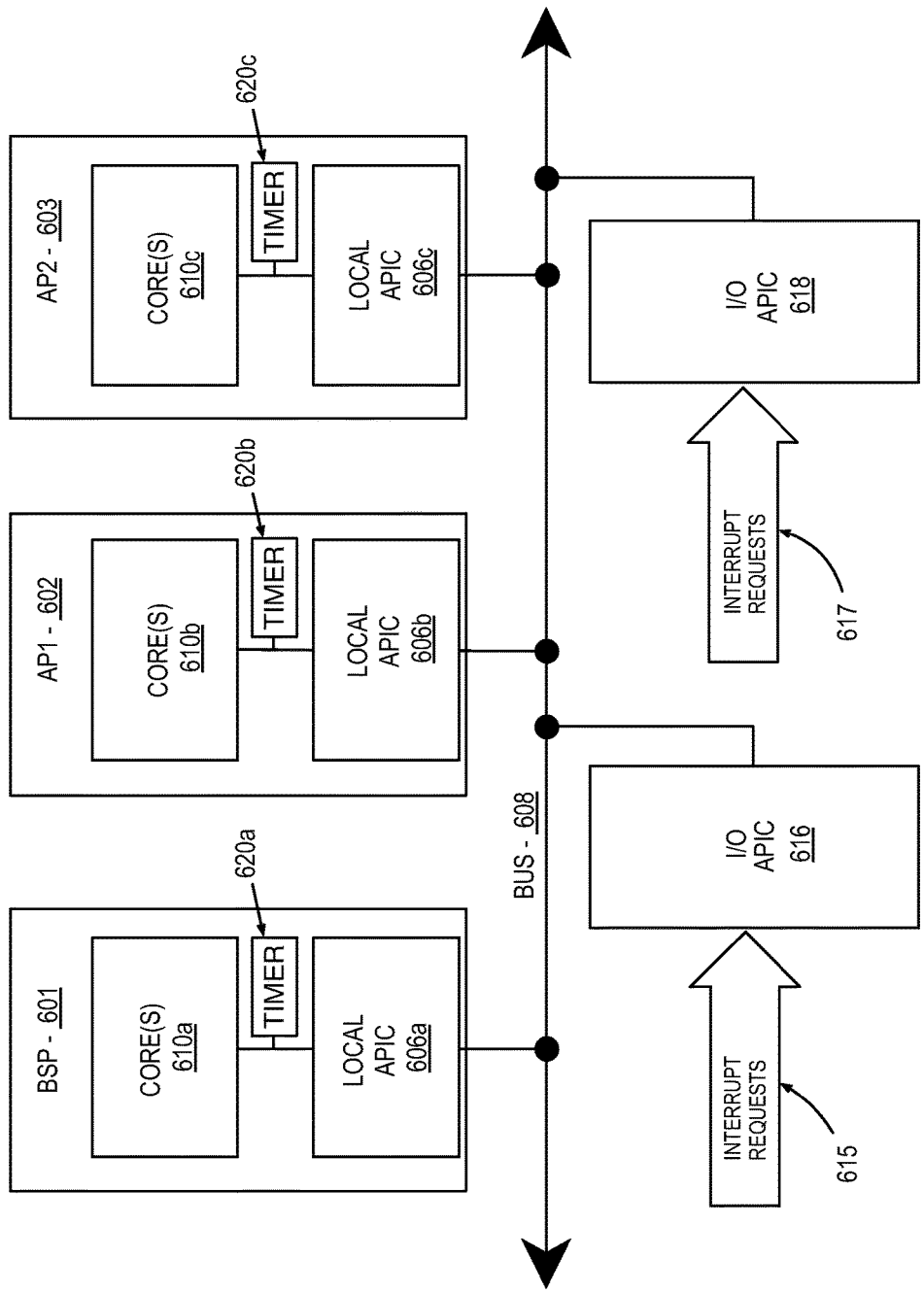
FIG. 6 is a block diagram of a multi-processor system including integrated interrupt disabled timers, according to an embodiment.

FIG. 6 is a block diagram of a multi-processor system including integrated interrupt disabled timers, according to an embodiment. The multi-processor system includes a bootstrap processor (BSP) 601 that is responsible for system startup and shutdown, as well as a first application processor (AP1) 602 and a second application processor (AP2) 603 available to one or more multi-processor aware operating systems executing on the system. In one embodiment, interrupt disabled timers 620 (e.g., 620a, 620b, and 620c) are included in each of the processors to time the duration of interrupt-disabled periods within the respective processor. The interrupt disabled timers 620 operate within the clock domain of the respective processor, each of which includes ones or more cores 610 (e.g., 610a, 610b, or 610c) and a local advanced programmable interrupt controller (APIC) 606 (e.g., 606a, 606b, or 606c). The processors couple to a bus 608 which can include one or more of an interrupt controller communications bus, a memory bus, or an I/O bus. Multiple I/O APICs 616, 618 receive and arbitrate interrupt requests 615, 617 before routing the requests to the processors 601, 602, 603. The multiple local APICs 606 and I/O APICs 616, 618 can operate as a single entity by communicating with one another over the bus 608. The APICs deliver interrupt requests 615, 617 from interrupt sources (e.g., I/O devices) to interrupt destinations throughout the multiprocessor system.

Each of the timers 620 may be power managed in conjunction with other system components. The timers 620 may be power gated when not in use and automatically power ungated during the interrupt handling process. The timers 620 may be power managed individually or in conjunction with other interrupt handling logic (e.g., local APIC 606).

Exemplary Processor Overview

The processors described herein may be implemented in various ways for various purposes. For example, the processor implementation may include any one or more of: 1) a general purpose in-order core intended for general-purposed computing; 2) a high performance general purpose out-of-order core intended for general-purpose computing; and 3) a special purpose core intended primarily for graphics or scientific (throughput) computing. Implementations of different processors may include: 1) a central processing unit (CPU) including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors may lead to different computer system architectures other than the one shown in FIG. 3. The different system architectures include 1) a coprocessor on a separate chip from an application processor; 2) a coprocessor on a separate die in the same package as an application processor; 3) a coprocessor on the same die as an application processor (in which case, such a coprocessor is sometimes referred to as special purpose logic, such as integrated graphics and/or scientific (throughput) logic, or as special purpose cores); and 4) a system on a chip that may include an application processor, coprocessor, and additional functionality on the same die.

Figure 7:
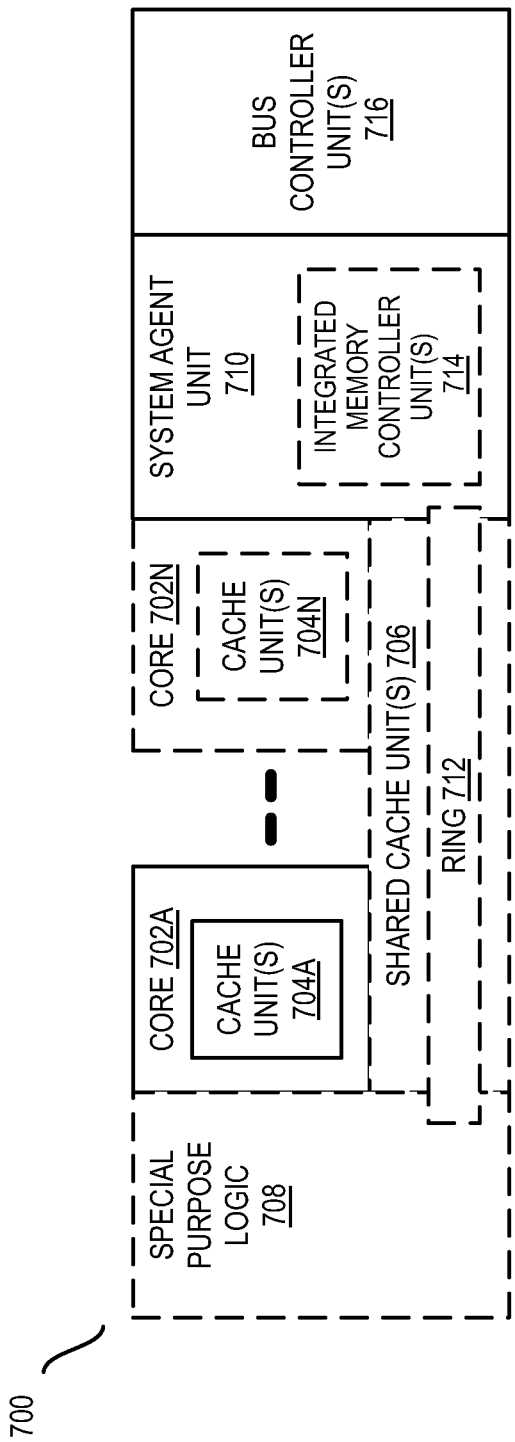
FIG. 7 is a block diagram of a processor that may have more than one core, may have an integrated memory controller, and may have integrated graphics according to the various embodiments.

FIG. 7 is a block diagram of a processor 700 that may have more than one core, may have an integrated memory controller, and may have integrated graphics according to various embodiments. The solid lined boxes in FIG. 7 illustrate a processor 700 with a single core 702A, a system agent 710, a set of one or more bus controller units 716, while the optional addition of the dashed lined boxes illustrates an alternative processor 700 with multiple cores 702A-N, a set of one or more integrated memory controller unit(s) 714 in the system agent unit 710, and special purpose logic 708. Each of the cores 702A-N includes one or more internal cache units 704A-N. Each core may also have access to one or more shared cached units 706.

Thus, different implementations of the processor 700 may include: 1) a CPU with the special purpose logic 708 being integrated graphics and/or scientific (throughput) logic (which may include one or more cores), and the cores 702A-N being one or more general purpose cores (e.g., general purpose in-order cores, general purpose out-of-order cores, a combination of the two); 2) a coprocessor with the cores 702A-N being a large number of special purpose cores intended primarily for graphics and/or scientific (throughput); and 3) a coprocessor with the cores 702A-N being a large number of general purpose in-order cores. Thus, the processor 700 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 700 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 706, and external memory (not shown) coupled to the set of integrated memory controller units 714. The set of shared cache units 706 may include one or more mid-level caches, such as level 2 (L2), level 3 (L3), level 4 (L4), or other levels of cache, a last level cache (LLC), and/or combinations thereof. While in one embodiment a ring based interconnect unit 712 interconnects the integrated graphics logic 708, the set of shared cache units 706, and the system agent unit 710/integrated memory controller unit(s) 714, alternative embodiments may use any number of well-known techniques for interconnecting such units. In one embodiment, coherency is maintained between one or more cache units 706 and cores 702-A-N.

In some embodiments, one or more of the cores 702A-N are capable of multi-threading. The system agent 710 includes those components coordinating and operating cores 702A-N. The system agent unit 710 may include for example a power control unit (PCU) and a display unit. The PCU may be or include logic and components needed for regulating the power state of the cores 702A-N and the integrated graphics logic 708. The display unit is for driving one or more externally connected displays.

The cores 702A-N may be homogenous or heterogeneous in terms of architecture instruction set; that is, two or more of the cores 702A-N may be capable of execution the same instruction set, while others may be capable of executing only a subset of that instruction set or a different instruction set.

Exemplary Computer Architectures

FIGS. 8-11 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 8:
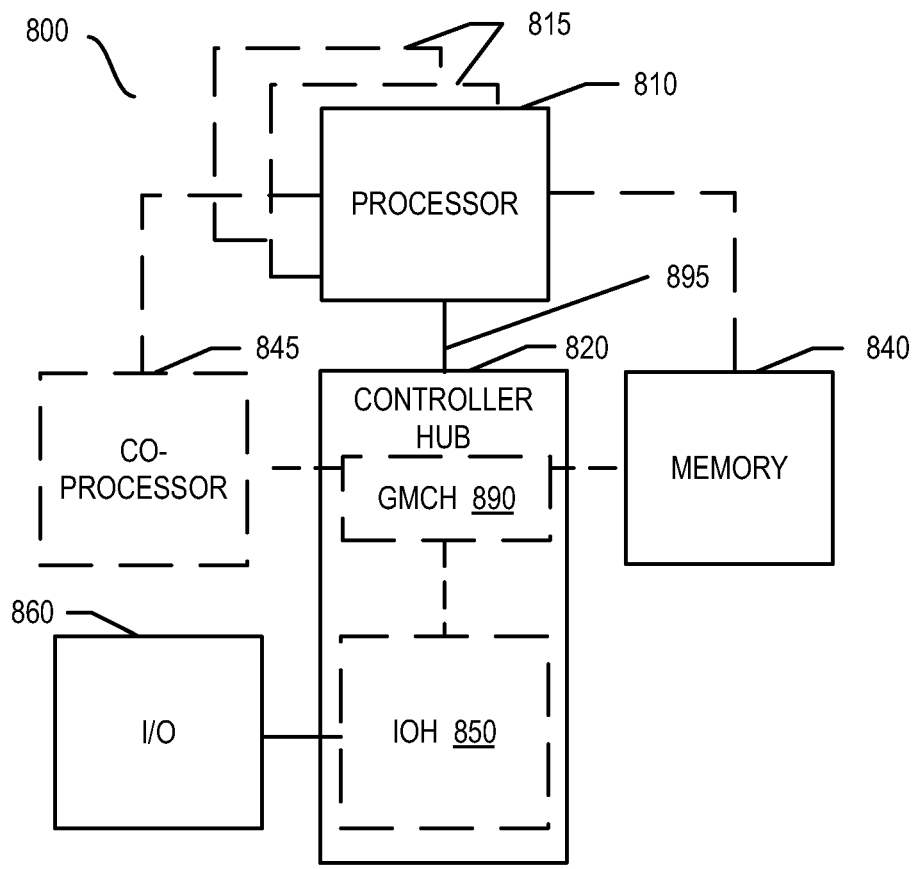
FIGS. 8-11 are block diagrams of exemplary computer architectures.

Referring now to FIG. 8, shown is a block diagram of a system 800 in accordance with one embodiment. The system 800 may include one or more processors 810, 815, which are coupled to a controller hub 820. In one embodiment the controller hub 820 includes a graphics memory controller hub (GMCH) 890 and an Input/Output Hub (IOH) 850 (which may be on separate chips); the GMCH 890 includes memory and graphics controllers to which are coupled memory 840 and a coprocessor 845; the IOH 850 is couples input/output (I/O) devices 860 to the GMCH 890. Alternatively, one or both of the memory and graphics controllers are integrated within the processor (as described herein), the memory 840 and the coprocessor 845 are coupled directly to the processor 810, and the controller hub 820 in a single chip with the IOH 850.

The optional nature of additional processors 815 is denoted in FIG. 8 with broken lines. Each processor 810, 815 may include one or more of the processing cores described herein and may be some version of the processor 900.

The memory 840 may be, for example, dynamic random access memory (DRAM), phase change memory (PCM), or a combination of the two. For at least one embodiment, the controller hub 820 communicates with the processor(s) 810, 815 via a multi-drop bus, such as a frontside bus (FSB), point-to-point interface such as QuickPath Interconnect (QPI), or similar connection 895.

In one embodiment, the coprocessor 845 is a special-purpose processor, such as, for example, a high-throughput MIC processor, a network or communication processor, compression engine, graphics processor, GPGPU, embedded processor, or the like. In one embodiment, controller hub 820 may include an integrated graphics accelerator.

There can be a variety of differences between the physical resources 810, 815 in terms of a spectrum of metrics of merit including architectural, microarchitectural, thermal, power consumption characteristics, and the like.

In one embodiment, the processor 810 executes instructions that control data processing operations of a general type. Embedded within the instructions may be coprocessor instructions. The processor 810 recognizes these coprocessor instructions as being of a type that should be executed by the attached coprocessor 845. Accordingly, the processor 810 issues these coprocessor instructions (or control signals representing coprocessor instructions) on a coprocessor bus or other interconnect, to coprocessor 845. Coprocessor(s) 845 accept and execute the received coprocessor instructions.

Figure 9:
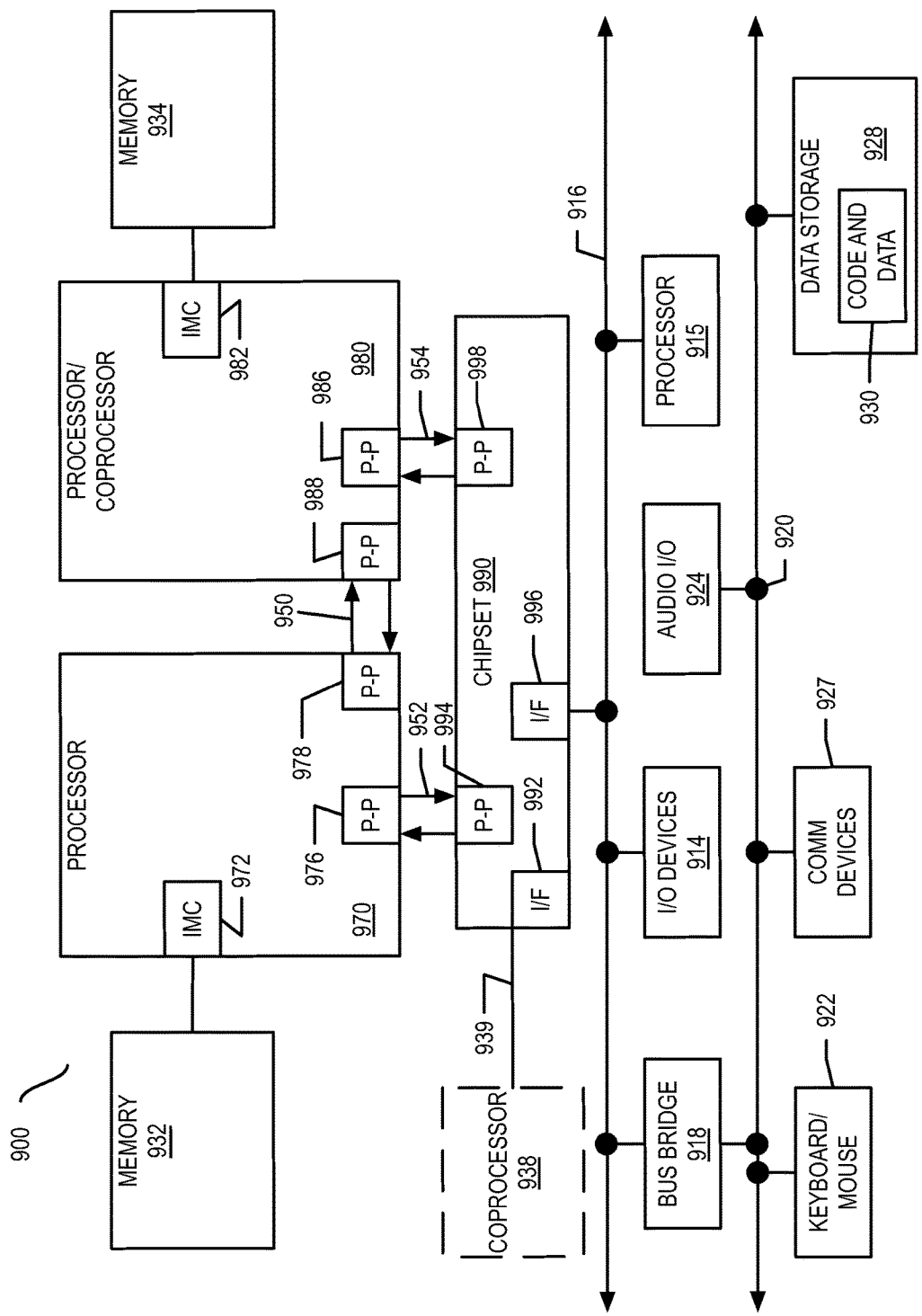

Referring now to FIG. 9, shown is a block diagram of a first more specific exemplary system 900 in accordance with an embodiment. As shown in FIG. 9, multiprocessor system 900 is a point-to-point interconnect system, and includes a first processor 970 and a second processor 980 coupled via a point-to-point interconnect 950. Each of processors 970 and 980 may be some version of the processor 900. In one embodiment, processors 970 and 980 are respectively processors 1010 and 1015, while coprocessor 938 is coprocessor 1045. In another embodiment, processors 970 and 980 are respectively processor 1010 coprocessor 1045.

Processors 970 and 980 are shown including integrated memory controller (IMC) units 972 and 982, respectively. Processor 970 also includes as part of its bus controller units point-to-point (P-P) interfaces 976 and 978; similarly, second processor 980 includes P-P interfaces 986 and 988. Processors 970, 980 may exchange information via a point-to-point (P-P) interface 950 using P-P interface circuits 978, 988. As shown in FIG. 9, IMCs 972 and 982 couple the processors to respective memories, namely a memory 932 and a memory 934, which may be portions of main memory locally attached to the respective processors.

Processors 970, 980 may each exchange information with a chipset 990 via individual P-P interfaces 952, 954 using point-to-point interface circuits 976, 994, 986, 998. Chipset 990 may optionally exchange information with the coprocessor 938 via a high-performance interface 939. In one embodiment, the coprocessor 938 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 990 may be coupled to a first bus 916 via an interface 996. In one embodiment, first bus 916 may be a Peripheral Component Interconnect (PCI) bus, or a bus such as a PCI Express bus or another third generation I/O interconnect bus, although the scope of the embodiments is not so limited.

As shown in FIG. 9, various I/O devices 914 may be coupled to first bus 916, along with a bus bridge 918 which couples first bus 916 to a second bus 920. In one embodiment, one or more additional processor(s) 915, such as coprocessors, high-throughput MIC processors, GPGPU's, accelerators (such as, e.g., graphics accelerators or digital signal processing (DSP) units), field programmable gate arrays, or any other processor, are coupled to first bus 916. In one embodiment, second bus 920 may be a low pin count (LPC) bus. Various devices may be coupled to a second bus 920 including, for example, a keyboard and/or mouse 922, communication devices 927 and a storage unit 928 such as a disk drive or other mass storage device which may include instructions/code and data 930, in one embodiment. Further, an audio I/O 924 may be coupled to the second bus 920. Note that other architectures are possible. For example, instead of the point-to-point architecture of FIG. 9, a system may implement a multi-drop bus or other such architecture.

Figure 10:
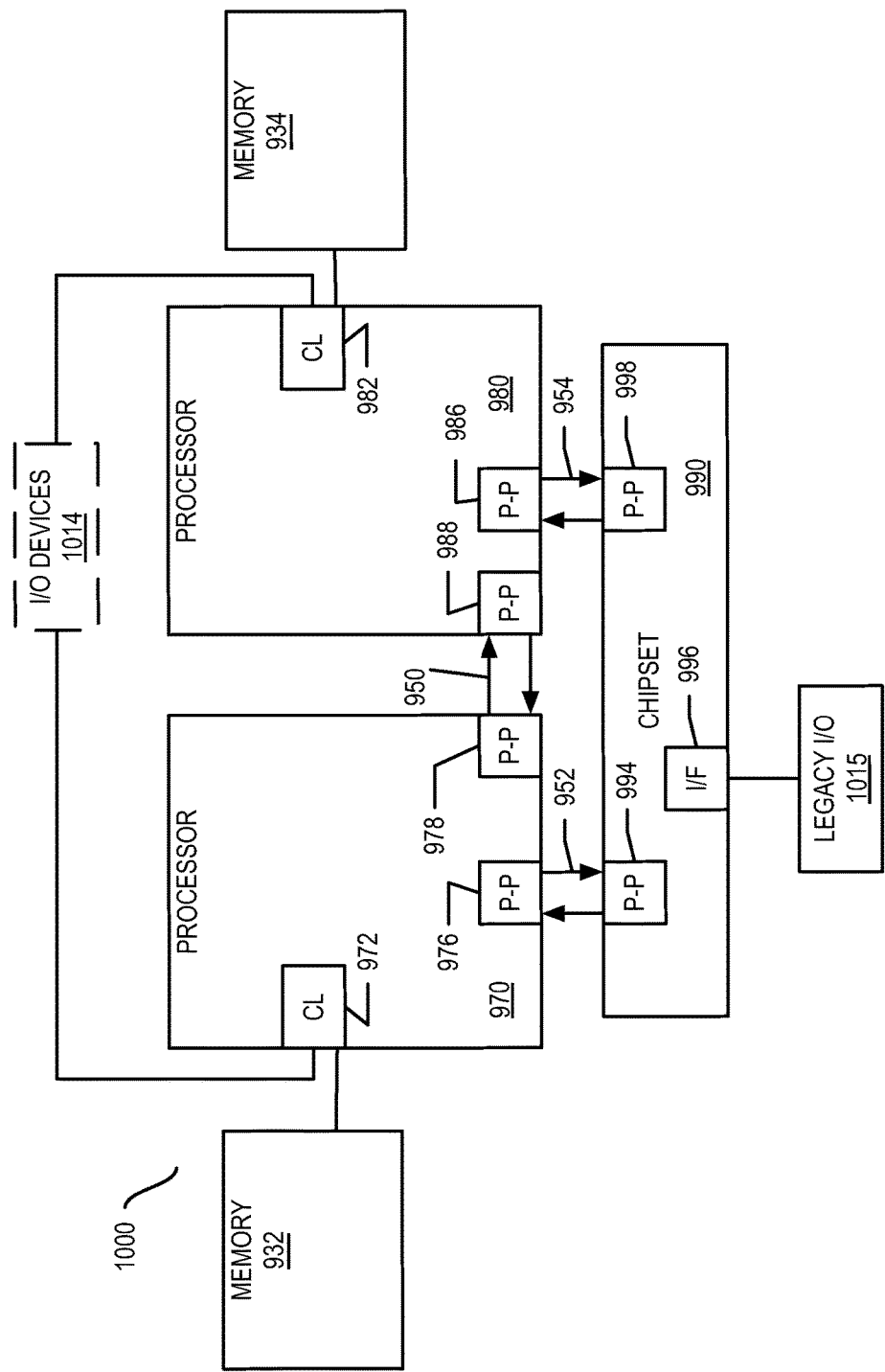

Referring now to FIG. 10, shown is a block diagram of a second more specific exemplary system 1000 in accordance with an embodiment. Like elements in FIGS. 9 and 10 bear like reference numerals, and certain aspects of FIG. 9 have been omitted from FIG. 10 in order to avoid obscuring other aspects of FIG. 10.

FIG. 10 illustrates that the processors 970, 980 may include integrated memory and I/O control logic ("CL") 972 and 982, respectively. Thus, the CL 972, 982 include integrated memory controller units and include I/O control logic. FIG. 10 illustrates that not only are the memories 932, 934 coupled to the CL 972, 982, but also that I/O devices 1014 are also coupled to the control logic 972, 982. Legacy I/O devices 1015 are coupled to the chipset 990.

Figure 11:
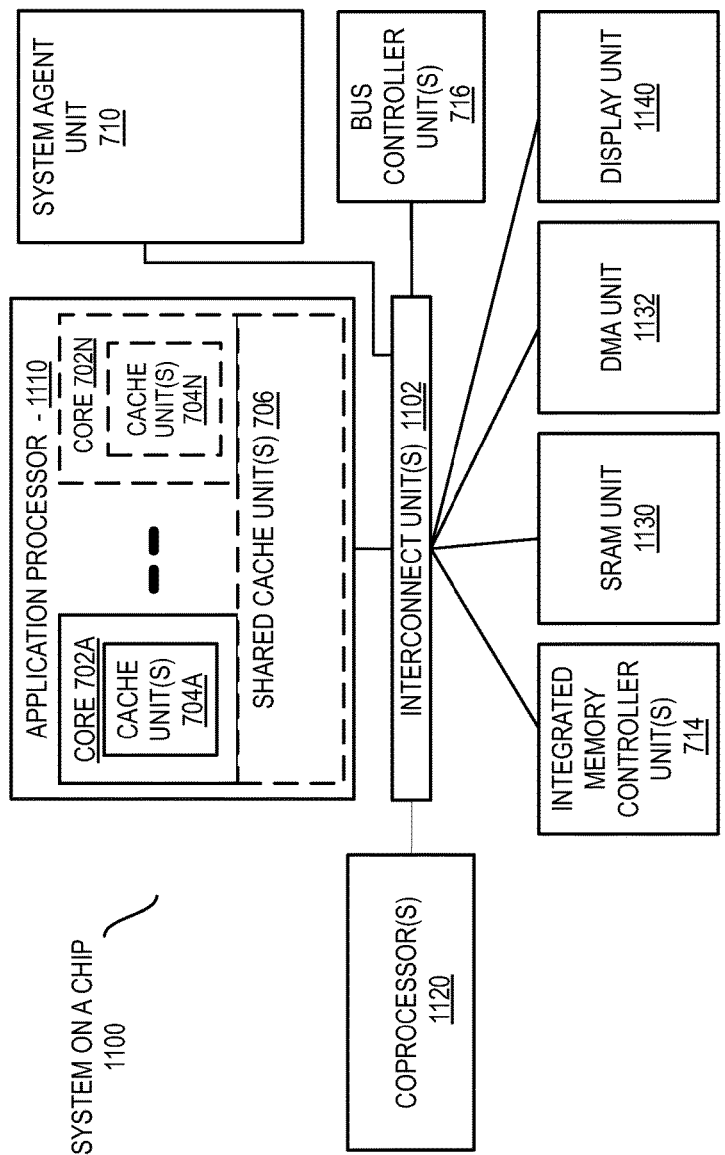

Referring now to FIG. 11, shown is a block diagram of a SoC 1100 in accordance with an embodiment. Similar elements in FIG. 9 bear like reference numerals. Also, dashed lined boxes are optional features on more advanced SoCs. In FIG. 11, an interconnect unit(s) 1102 is coupled to: an application processor 1110 which includes a set of one or more cores 202A-N and shared cache unit(s) 906; a system agent unit 910; a bus controller unit(s) 916; an integrated memory controller unit(s) 914; a set or one or more coprocessors 1120 which may include integrated graphics logic, an image processor, an audio processor, and a video processor; an static random access memory (SRAM) unit 1130; a direct memory access (DMA) unit 1132; and a display unit 1140 for coupling to one or more external displays. In one embodiment, the coprocessor(s) 1120 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments may be implemented as computer programs or program code executing on programmable systems comprising at least one processor, a storage system (including volatile and non-volatile memory and/or storage elements), at least one input device, and at least one output device.

Program code, such as code 930 illustrated in FIG. 9, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Accordingly, embodiments also include non-transitory, tangible machine-readable media containing instructions or containing design data, such as Hardware Description Language (HDL), which defines structures, circuits, apparatuses, processors and/or system features described herein. Such embodiments may also be referred to as program products.

Various components can be a means for performing the operations or functions described. Each component described herein includes software, hardware, or a combination of these. The components can be implemented as software modules, hardware modules, special-purpose hardware (e.g., application specific hardware, application specific integrated circuits (ASICs), DSPs, etc.), embedded controllers, hardwired circuitry, etc.

The embodiments described herein present a hardware-based mechanism to measure the Interrupt disabled duration to facilitate the development and improve the operational stability of time critical embedded applications. Embodiments of the interrupt disabled timer can enable the early detection of problems that may arise due to extended periods spends in ISR execution. In one embodiment, the interrupt-disabled timer is a 32/64 bit timer dedicated to timing the interrupt disable duration and able to trigger an processor exception if an interrupt is disabled for longer than a specified limit. The timer may be an apparatus comprising an input to receive a start signal, a counter, and an output signal. The start signal can indicate that an interrupt on a processor is disabled, the counter can be used to determine an interrupt disabled duration, and the output can be to signal a timer event based on the counter. The timer event is to indicate the interrupt disabled duration exceeds a limit determined at least in part by the clock frequency.

The timer apparatus may further include a clock line to receive a clock signal. Accordingly the apparatus may operate at the frequency of the processor clock signal. The frequency of the clock signal may be variable, and the interrupt disabled duration limit may be adjusted based on a change in the clock frequency. The apparatus may couple to the processor via the input, the output, or both of the input and the output. In one embodiment, the output of the apparatus couples to the processor to cause a hardware exception in response to the timer event. The output can couple to a dedicated input to trigger the hardware exception or can couple to a shared input. In one embodiment the output couples to a non-maskable interrupt line, a high priority interrupt line, or a fast interrupt line of the processor. In one embodiment, the timer is disabled in response to an indication that the interrupt on the processor is re-enabled.

In one embodiment, a system comprises a processor including one or more maskable interrupt lines and a timer circuit to receive a mask indication that at least one of the one or more maskable interrupt lines is masked, start a counter in response to the mask indication, and output a timer event signal based on the counter. In one embodiment, the interrupt disabled duration is the number of processor clock cycles in which the interrupt line is masked and the timer event signal indicates that the counter matches a determined limit in which interrupts may be disabled before triggering an exception on the processor. In response to the mask indication, the timer circuit can initialize the counter to a default value, which may be the determined limit if the counter is a countdown counter circuit. In one embodiment, the processor of the system includes a timer exception handler to handle the timer exception. The exception may be a dedicated exception. The timer circuit can be configured to stop the counter in response to an unmask indication that one or more maskable interrupt lines is unmasked and interrupts may be received over the interrupt lines. In one embodiment, the mask and unmask indications are generated in response to a change in a flag register of the processor.

In one embodiment, a machine-readable medium having stored thereon data, which if performed by at least one machine, causes the at least one machine to fabricate at least one integrated circuit to perform a method comprising starting a counter in the timer circuit in response to an indication that an interrupt on a processor is disabled and signaling the processor in response to an event on the timer circuit. In one embodiment, the method performed by the medium further comprises enabling the timer circuit and initializing the timer circuit using a default value before starting the timer. The default value is a number of processor clocks before a timer event is triggered and the timer circuit is in the clock domain of the processor. The default value can be automatically modified in response to a change in the frequency of the processor clock. In one embodiment, the default value is a 64-bit value. The timer circuit may be disabled in response to an indication that the interrupt on the timer is re-enabled.

Besides what is described herein, various modifications can be made to the disclosed embodiments and implementations without departing from their scope. Therefore, the illustrations and examples herein should be construed in an illustrative, and not a restrictive sense. The scope and spirit of the embodiments should be measured solely by reference to the claims that follow.

What is claimed is:

1. An apparatus comprising:
an input to receive a start signal, the start signal to indicate an interrupt on a processor is disabled;
a counter, of a plurality of counters, to count an interrupt disabled duration, wherein the counter is dedicated to the interrupt; and
an output to signal a timer event based on the count of the counter.

2. The apparatus of claim 1 further comprising a clock line to receive a clock signal having a frequency of the clock signal of the processor.

3. The apparatus of claim 2 wherein the timer event to indicate the interrupt disabled duration exceeds a limit determined at least in part by the frequency.

4. The apparatus of claim 3 wherein the frequency is variable and the limit is re-determined responsive to a change in the frequency.

5. The apparatus of claim 1 wherein the input or the output to couple to the processor.

6. The apparatus of claim 5 wherein the output to couple to the processor to cause a hardware exception in response to the timer event.

7. The apparatus of claim 6 wherein the interrupt on the processor is a first interrupt line, the output to couple to a second interrupt line, and the second interrupt line is a non-maskable interrupt line.

8. The apparatus of claim 7 wherein the second interrupt line is a high priority interrupt line or a fast interrupt line.

9. A system comprising:
a processor including one or more maskable interrupt lines; and
a timer circuit to:
receive a mask indication that at least one of the one or more maskable interrupt lines is masked,
start a counter, of a plurality of counters, in response to the mask indication, wherein the counter is dedicated to the one or more maskable interrupts, and
output a timer event signal based on the counter.

10. The system of claim 9 wherein the counter to determine an interrupt disabled duration comprising a number of processor clock cycles the interrupt line is masked.

11. The system of claim 10 wherein the timer event signal indicates the counter matches a determined value and the timer circuit further to initialize the counter in response to the mask indication.

12. The system of claim 9 wherein the timer event signal to cause an exception on the processor.

13. The system of claim 12 wherein the processor includes a timer exception handler to handle the timer exception.

14. The system of claim 13 wherein the timer exception handler is a dedicated to handling timer exceptions.

15. The system of claim 9 wherein the timer circuit to stop the counter in response to an unmask indication that the at least one of the one or more maskable interrupt lines is unmasked.

16. The system of claim 15 wherein the mask indication and the unmask indication are responsive to a change in a flag register of the processor.

17. A non-transitory machine-readable medium having stored thereon data, which if performed by at least one machine, causes the at least one machine to fabricate at least one integrated circuit to perform a method comprising:
starting a counter, of a plurality of counters, in a timer circuit in response to a mask indication that an interrupt on a processor is disabled, wherein the counter is dedicated to the one or more maskable interrupts; and
signaling the processor in response to an event on the timer circuit.

18. The non-transitory medium as in claim 17 further comprising:
enabling the timer circuit;
initializing the timer circuit using a default value before starting the timer;
wherein the timer circuit is in a clock domain of the processor; and
wherein the default value is a number of processor clocks before a timer event.

19. The non-transitory medium as in claim 18 further comprising automatically modifying the default value in response to changing a frequency of the processor clock after initializing the timer circuit to the default value, wherein the default value is a 64-bit value.

20. The non-transitory medium as in claim 17 further comprising disabling the timer circuit in response to an unmask indication that the interrupt on the processor is enabled.

* * * * *